3,323,289
METHOD OF REMOVING NEUTRAL MALODOROUS IMPURITIES FORMED IN SULFATE PULPING

Emil Teodor Venemark, deceased, late of Ornskoldsvik, Sweden, by Rut Venemark, legal representative, Ornskoldsvik, Sweden
No Drawing. Filed Oct. 16, 1964, Ser. No. 404,520
Claims priority, application Sweden, Oct. 18, 1963, 11,478/63
13 Claims. (Cl. 55—73)

The present invention relates to a method of removing neutral malodorous organic impurities which are slightly soluble in water from an impure medium containing these impurities, said medium consisting of a liquid, a vapor or a gas, although not including combustion gases, obtained in the manufacture of sulfate cellulose pulp.

In sulfate cellulose pulping, volatile malodorous and toxic substances are formed, which are liberated more or less completely when the digester is relieved, when the digester contents are blown from the digester after a completed cook, and when the black liquor is concentrated by evaporation. The vapor liberated during relieving of the digester or during blowing of the digester contents, contain mainly impurities, such as hydrogen sulfide and mercaptans, which are acidic in character, together with neutral impurities, such as sulfides, disulfides, sulfurous terpene compounds, alcohols and ketones, as well as alkaline impurities, such as ammonia and amines, while the impurities formed in evaporation of the black liquor consist substantially of hydrogen sulfide and mercaptans. In continuous pulping, by the sulfate process with cold blowing, the removal of vapors will be so incomplete, however, that a major portion of the volatile substances accompany the black liquor to the evaporation step and are released there. Hitherto, the major portion of these impurities has been permitted to be taken up in and to be discharged with the waste water, while a minor portion has accompanied gases and uncondensed vapors into the atmosphere. Purification methods which either transfer the malodorous substances from the condensates into the atmosphere or attempt to absorb the malodorous volatile substances by washing the uncondensable gases with various liquids and oxidize them, e.g., after addition of air, have been suggested but have been little successful. These methods have usually involved high investments and operating costs, although their value has often been questionable. As regards contaminated gases having a low proportion of impurities, the only quantitatively efficient method is probably a complete combustion, but this method must hitherto be avoided, because if the impurities are temporarily enriched, explosions may occur in conduits and equipment. Discharge of impurities from pulping installations into rivers, lakes, coastal waters and the atmosphere has increased greatly as the plants have become larger and involves problem which in some cases even menace the existence of the factories.

A method of removing acidic malodorous impurities formed in sulfate pulping, such as e.g., hydrogen sulfide and mercaptans, virtually quantitatively from vapors and gases containing these substances, has been suggested in Canadian Patent No. 680,021, according to which a strong alkaline solution is atomized into the vapor, whereupon the droplets of the resulting salt solution are precipitated and recovered.

The object of the present invention is to remove the impurities separately at or close to their source, before they are diluted and, in suitable cases, after acidic components have first been removed as disclosed in the patent above referred to. In accordance with this invention, neutral malodorous organic impurities, which are slightly soluble in water, such as sulfides, disulfides, sulfurous terpene compounds, and other organic substances slightly soluble in water, such as terpenes, formed in the manufacture of sulfate cellulose pulp, are removed from an impure medium, consisting of a liquid, vapor or gas, containing these impurities, with the exception of combustion gases. The method comprises extracting the impure medium with a water-immiscible organic liquid which is a solvent for organic sulfides, by atomizing the organic liquid into the impure medium, so that the impurities are absorbed by the organic liquid, separating the organic liquid and, if desired, recovering the impurities therefrom.

The water-immiscible organic liquid which is a solvent for organic sulfides, must have a viscosity such that it can readily be atomized into the impure medium at the prevailing temperature. It was found that a viscosity of up to 50° Engler at the temperature of the organic liquid as introduced into the impure medium is particularly suitable. Any organic liquid satisfying the conditions referred to as regards immiscibility, solvent and viscosity characteristics, can be employed, but organic liquids which are inexpensive and are not excessively volatile are to be preferred. Suitable liquids are, e.g., hydrocarbons and mixtures of hydrocarbons, such as fuel oils, kerosene, tar oil fractions, and sulfate turpentine. If it is intended to destroy the neutral malodorous impurities after the extraction step by combustion, it is preferable to use a fuel oil of suitable viscosity, which is then burnt while taking the precautions which a changed flash point may necessitate. If it is desired to recover the extracted sulfur compounds, of which in particular the most highly volatile have some market value, it is preferable to use a hydrocarbon fraction having a not too high proportion of highly volatile substances, but having a very good solvent power for organic sulfides. Sulfate turpentine from which impurities having boiling points below 150° C. have been removed, is a suitable solvent of that type.

The extraction of the neutral, slightly water-soluble, malodorous organic impurities must be carried out so that the organic liquid is atomized into the impure medium. If this is vaporous or gaseous, atomization is conveniently achieved by passing the liquid under pressure through atomizing means, such as nozzles or diffusers, provided in the path of the flowing impure medium, in which case injection can take place concurrently, countercurrently or transversely with respect to the direction of flow of the impure medium. If the impure medium is liquid, the extraction can be carried out by well-known apparatus for liquid-to-liquid extraction, e.g., in a Friedrich extractor, care being taken that a sufficient atomization of the organic liquid is achieved.

The temperature used in the extraction step should be such that the extraction temperature is below the boiling point of the most volatile impurity (for methyl sulfide about 36° C.). Extraction temperature, as used here, refers to the temperature which the droplets of the injected organic liquid receive after it has been atomized in the impure medium. Room temperature is suitable, but lower temperatures can advantageously be used in the case of organic liquids having a low viscosity.

After the organic liquid has been atomized in the impure medium and the neutral, slightly water-soluble organic impurities have been taken up by the organic liquid, the latter is separated by any suitable conventional method or means of separation, e.g. a cyclone of conventional type in the case of vapors or gases, or settling or centrifuging equipment in the case of liquids. When the impure medium is a vapor or a mixture of vapors and so-called uncondensable gases, it is particularly suitable to atomize the organic liquid into a stream of the impure medium and then condense the vapor by cooling to a temperature below the boiling point of the most volatile of the impurities, to form two phases, one containing water free from impurities and the other one containing the water-immiscible organic liquid in which the neutral, slightly water-soluble, malodorous organic impurities are dissolved. The two phases are separated in any suitable manner, e.g. by settling or treatment in cyclones, or preferably, by treatment in centrifugal separators in one or more steps. When separating the aqueous phase from the organic phase it may be suitable to adjust the pH value by adding alkali or acid. Other additives can suitably be introduced in small amounts, e.g. to prevent formation of emulsions. The aqueous phase obtained from such separation is so pure that it can be directly discharged to the surrounding, but it is also possible to return it for reuse in the process. If desired, the aqueous phase can be mixed with other waste waters of the factory, containing oxidizing agent, e.g. white water from pulp bleaching, and/or be subjected to oxidation with strong oxidizing agents. The organic phase, obtained after oxidation, can be burnt directly together with the impurities, or the latter can be removed wholly or in part, e.g. by evaporation. The latter method is suitable when it is desired to recover some of the impurities. For example, the most volatile of the impurities in the organic phase may be distilled and recovered and the remaining organic liquid be returned to the process. It is also possible to utilize the organic liquid from which volatile impurities have been removed in several purification steps, e.g. such that when recycled it is first used to wash uncondensable gases remaining after the condensation step, before it is returned to the extraction step.

The medium purified by the extraction step, usually has so low concentration of impurities that as a rule it can be immediately passed out of the factory or, in the case of uncondensable gases, be subjected to combustion in a furnace without any danger of explosive mixtures appearing in the supply system.

To obtain the highest possible efficiency of the method of this invention, the content of uncondensable gases in the impure medium should be low, and therefore the method is not applicable to combustion gases or black liquor vapors resulting from evaporation with combustion gases.

The invention is illustrated by the following working examples:

EXAMPLE 1

Black liquor was withdrawn from a continuous sulfate digester, at the end of the cook, the black liquor having a temperature of 170° C. at the start of the withdrawal and 120° C. at the end of the withdrawal process, and was vented at a lower pressure in a separate container with simultaneous reduction of temperature. The resulting vapor, containing hydrogen sulfide, mercaptans, organic sulfides, turpentine etc., was first treated with atomized white liquor containing 100 grs. of sodium hydroxide per litre in a tubular conduit having a droplet separator to remove the acidic impurities, whereupon 3 kilograms of sulfate turpentine from which the highly volatile substances had been removed, were introduced into the vapor thus treated while it flowed at a velocity of 20 ms. per second. The vapor was then passed to a surface condenser, where it was cooled to 25° C., whereupon the resulting condensate was caused to separate the major portion of the organic phase in a so-called turpentine separator. The effluent water was treated in an oil separator to remove traces of the organic liquid. The water leaving the oil separator was of a purity such that it could be passed directly to the recipient. The turpentine containing the impurities was treated by distillation to remove substances boiling below 80° C. which could be sold as crude methyl sulfide, whereupon it was returned to the process.

EXAMPLE 2

The vapor resulting from blowing of a discontinuous digester was condensed in a jet condenser operating at 97° C. The resulting uncondensable gas, saturated with steam, was supplied to a secondary jet condenser, wherein it was cooled to about 30° C. and was then treated with atomized aqueous alkali to remove acidic impurities in the manner described in Example 1. The gas thus treated was passed at a velocity of 2 ms. per second through a tube where it encountered descending droplets of fuel oil No. 1 having a temperature of about 18° C. The gas purified in this manner was so pure that it could be discharged directly or supplied to a furnace for combustion without danger of explosive mixtures being formed in the supply conduits. The descending oil was collected and used as a fuel.

EXAMPLE 3

The liquor vapor condensate from evaporation of black liquor and excess condensate from the blowing condensate system were supplied to a stripper after the pH had been adjusted to slightly below 5. The stripped vapor was treated as described in Example 1 to remove hydrogen sulfide, mercaptans and other acidic components and was condensed in a condenser. The resulting condensate of 25° C. was extracted in a Friedrich extractor with kerosene. The aqueous phase was so pure that it was passed to the waste water recipient, while the kerosene was recirculated to the system and subsequently used as a fuel.

EXAMPLE 4

An aqueous solution of sodium hydroxide was atomized in vapor coming from the stripper according to the previous example to remove acidic impurities. Immediately thereafter, without separation of the alkali droplets, a tar oil fraction having a boiling range of 220 to 300° C. was atomized at 18° C. into the vapor. The vapor was then passed to a condenser operating at a temperature of 28° C., whereupon the resulting condensate was separated into an aqueous and an oil phase. The aqueous phase was returned to the digesting system, after removing traces of oil therefrom, while the oil was returned to the process after distilling off dimethyl sulfide therefrom.

I claim:

1. A method of disposing of waste liquors and gases obtained in the manufacture of sulfate cellulose pulp so that any waste materials can be discharged into available water and the atmosphere, which comprises atomizing a water-immiscible organic solvent containing only carbon and hydrogen in the molecule and which is a solvent for organic sulfides into contact at atmospheric pressure with waste fluid medium containing neutral slightly water-soluble malodorous organic sulfur-containing compounds, dissolving such compounds soluble in such solvent, separating the organic solvent solution and burning the organic solvent solution, and discharging the residual waste fluid medium into available water and the atmosphere.

2. A method as in claim 1 wherein acidic, slightly water-soluble malodorous organic substances are removed from the liquor by pretreatment with an aqueous alkali solution.

3. A method as in claim 1, carried out at a temperature below the boiling point of the most volatile of the sulfur-containing compounds.

4. A method as in claim 1, in which the sulfur-containing compounds are volatilized upon pressure release of a digester.

5. A method as in claim 1, in which the sulfur-containing compounds are derived in vapor form by blowing a digester.

6. A method as in claim 1, in which prior to burning of the organic solvent the sulfur-containing compounds after atomization of the solvent thereinto are condensed, and the organic solvent then separated from the condensate.

7. A method as in claim 6, wherein a major portion of the organic solvent is removed from the condensate, and the condensate is then further purified by settling or centrifuging.

8. A method as in claim 1 including the steps of distilling the sulfur-containing compounds from the organic solvent, and thereafter recycling the organic solvent for further extraction prior to burning of the organic solvent.

9. A method as in claim 1, in which volatile sulfur-containing compounds in impure waste sulfate pulping liquor are volatilized and the resulting vapors extracted by atomizing the organic solvent thereinto.

10. A method as in claim 9 including the step of treating the residual liquor with an oxidizing agent prior to discharging it into available water and atmosphere.

11. A method as in claim 9 including the step of burning the residual liquor with a fuel prior to discharging it into available water and atmosphere.

12. A method as in claim 9 including the step of washing uncondensable gases from impure liquor with organic solvent, prior to extraction of the sulfur-containing compounds.

13. A method as in claim 1 in which the sulfur-containing compounds are present in condensate from the sulfate pulping process and are extracted by liquid-liquid extraction with the organic solvent.

References Cited
UNITED STATES PATENTS

| | | | |
|---|---|---|---|
| 1,469,958 | 10/1923 | Richter | 55—73 X |
| 1,946,489 | 2/1934 | De Jahn | 55—73 X |
| 2,198,743 | 4/1940 | Schuftan | 55—73 X |

FOREIGN PATENTS

| | | |
|---|---|---|
| 152,771 | 8/1953 | Australia. |

REUBEN FRIEDMAN, *Primary Examiner.*

J. ADEE, *Assistant Examiner.*